(12) United States Patent
Buerkle et al.

(10) Patent No.: US 9,211,910 B2
(45) Date of Patent: Dec. 15, 2015

(54) KS LATERAL GUIDANCE SYSTEM HAVING A MODIFIED CONTROL CHARACTERISTICS WHEN CORNERING

(75) Inventors: Lutz Buerkle, Leonberg (DE); Michael Weilkes, Diekholzen (DE); Michael Scherl, Bietigheim (DE); Tobias Rentschler, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1519 days.

(21) Appl. No.: 12/084,355

(22) PCT Filed: Sep. 19, 2006

(86) PCT No.: PCT/EP2006/066495
§ 371 (c)(1),
(2), (4) Date: Apr. 16, 2009

(87) PCT Pub. No.: WO2007/051671
PCT Pub. Date: May 10, 2007

(65) Prior Publication Data
US 2010/0004821 A1    Jan. 7, 2010

(30) Foreign Application Priority Data
Oct. 31, 2005   (DE) .......................... 10 2005 052 034

(51) Int. Cl.
*B62D 15/02*    (2006.01)
*B60W 30/12*    (2006.01)

(52) U.S. Cl.
CPC ........... *B62D 15/025* (2013.01); *B60T 2201/08* (2013.01); *B60T 2201/087* (2013.01); *B60W 30/12* (2013.01)

(58) Field of Classification Search
CPC . B62D 15/025; B60W 30/12; B60T 2201/08; B60T 2201/087
USPC ............ 701/28, 36, 41–42, 69; 180/408–410, 180/204, 6.2, 443, 446
See application file for complete search history.

(56) References Cited

U.S. PATENT DOCUMENTS

| | | | | |
|---|---|---|---|---|
| 5,913,375 A | * | 6/1999 | Nishikawa | 180/168 |
| 6,009,377 A | * | 12/1999 | Hiwatashi | 701/301 |
| 6,185,492 B1 | * | 2/2001 | Kagawa et al. | 701/41 |
| 6,487,501 B1 | * | 11/2002 | Jeon | 701/301 |
| 6,542,800 B2 | * | 4/2003 | Kawazoe et al. | 701/41 |
| 6,556,909 B2 | * | 4/2003 | Matsumoto et al. | 701/41 |

(Continued)

FOREIGN PATENT DOCUMENTS

| | | |
|---|---|---|
| DE | 101 14 470 | 10/2003 |
| EP | 1 348 610 | 10/2003 |

(Continued)

*Primary Examiner* — John Q Nguyen
*Assistant Examiner* — Nadeem Odeh
(74) *Attorney, Agent, or Firm* — Kenyon & Kenyon LLP

(57) ABSTRACT

A device for keeping a vehicle in its lane, including a reference model, which obtains geometric data regarding the position of the vehicle in the lane as well as data relating to the course of the lane from a lane detection system, and from these calculates a setpoint variable for controlling the vehicle position. In order to allow for corners to be cut, the guiding behavior of the control system is modified in such a way when cornering that, in the event of a deviation of the path of motion of the vehicle from the setpoint path of motion in the direction of the inside of the curve, no or only low steering forces are applied to the steering system.

11 Claims, 3 Drawing Sheets

(56) References Cited

U.S. PATENT DOCUMENTS

| | | | |
|---|---|---|---|
| 7,388,475 B2* | 6/2008 | Litkouhi | 340/435 |
| 2003/0195684 A1* | 10/2003 | Martens | 701/41 |
| 2004/0107035 A1* | 6/2004 | Tange et al. | 701/70 |
| 2004/0230375 A1* | 11/2004 | Matsumoto et al. | 701/301 |
| 2009/0222170 A1* | 9/2009 | Scherl et al. | 701/44 |
| 2010/0191421 A1* | 7/2010 | Nilsson | 701/41 |

FOREIGN PATENT DOCUMENTS

| | | |
|---|---|---|
| EP | 1 547 887 | 6/2005 |
| WO | 03/081713 | 11/2003 |
| WO | WO 03091813 | 11/2003 |

\* cited by examiner

KS LATERAL GUIDANCE SYSTEM HAVING A MODIFIED CONTROL CHARACTERISTICS WHEN CORNERING

FIELD OF THE INVENTION

The present invention relates to a device for keeping a vehicle in its lane.

BACKGROUND INFORMATION

There are various systems in the related art which support the driver of a motor vehicle in keeping the vehicle in its lane. For this purpose, such systems apply directed steering forces to the steering system of the vehicle if the vehicle leaves a prescribed path of motion. These systems are also called LKS systems (LKS: Lane Keeping Support). The degree of automation in this connection ranges from systems, which by the application of artificial steering forces indicate to the driver how he would have to operate the steering in order to keep the vehicle in its lane, to LKS systems that guide the vehicle in its lane in a fully automated manner.

LKS systems, as in DE 101 14 470 A1, for example, include essentially a lane detection system such as e.g. a video system, using which the course of the lane ahead of the vehicle and the relative position of the vehicle (the amount of deviation and orientation) in the lane may be determined. If the path of motion of the vehicle deviates too much from a prescribed path of motion, then the system varies the support torque exerted on the steering and thereby produces artificial steering forces. These are so strong that the driver is able to detect them haptically, and they are directed in such a way that the driver changes the steering wheel angle in the direction of the setpoint path of motion. If the steering wheel angle is too small, then the driver senses, for example, an additional torque in the direction of the inside of the curve. If the steering wheel angle is too large, on the other hand, then he senses an additional torque in the direction of the outside of the curve.

FIG. 1 shows a steering system having an LKS functionality, which is capable of keeping a vehicle 8 in its lane 10 in a fully automated manner. The system as a whole includes a sensor system 7 situated on vehicle 8 for lane detection such as e.g. a video system, by which it is possible to ascertain the amount of deviation and the orientation of vehicle 8 with respect to its lane 10 (amount of lateral deviation, path deviation angle) as well as the course of the lane (curvature, change in curvature) in front of the vehicle. Lane detection system 7 here includes a video camera and a special image processing software, which ascertains the desired geometric data from the image data.

The geometric data as well as additional driving state variables such as e.g. the driving speed are supplied to a mathematical reference model 13, which calculates from this a reference steering angle $\delta_{Ref}$. This reference steering angle $\delta_{Ref}$ is the steering angle that would have to be set in the steering system in order to keep vehicle 8 optimally in its lane 10. This value $\delta_{Ref}$ flows into a downstream control loop 11, which has the task of controlling the actual steering angle δ to match the specified setpoint value $\delta_{Ref}$ and thus to keep vehicle 8 in its lane (normally in the middle of the lane).

Control loop 11 includes a node 2 (adding node), at which a control deviation $\Delta\delta=\delta_{Ref}-\delta$ of the control variable is calculated, a transmission element 3, which forms the controller of control loop 11, and a steering control element 4 having a torque control loop, which forms the control element of steering angle control loop 11. Elements 2, 3, 4a and reference model 13 are normally implemented as software modules in a control unit 12.

Controller 3 has a P-behavior and is designed in such a way that a system deviation $\Delta\delta$ may be controlled in a stable manner. Controller 3 here includes a characteristic curve, which produces a guide torque (signal $M_E$) as a function of the system deviation, which is supplied to steering control element 4. Steering control element 4, which includes a controller 4a and an actuator 4b, converts the torque $M_E$, depending on the control characteristics, into an actuating torque $M_A$, which is then applied to the steering system. Actuating torque $M_A$ is superposed on torque $M_F$ applied by driver 1 on the steering wheel. This is represented by an additional adding node 5. The transmission characteristic of the steering system is finally represented by a block 6.

FIG. 2 shows a driving situation in which vehicle 8 drives straight ahead in its lane 9 and in the process deviates from the center of the lane 16. The LKS system in this case calculates a reference steering angle $\delta_{Ref}$, which is to return vehicle 8 to the center of the lane 16. In this state, the control system is at a point P of controller characteristic curve 14 shown on the right and produces a corresponding guide torque $M_E$ in the direction of the center of the lane 16.

Known LKS systems are usually designed in such a way that vehicle 8 is guided on a specified setpoint path of motion, normally the center of the lane. A disadvantage of these systems, however, is the fact that many drivers tend to drive through curves, not in the center, but near the inside of the curve, thus cutting the corner. Because known LKS systems are fundamentally designed to guide a vehicle in the center of the lane, a deviation results, when cutting corners, between the steering angle desired by the driver and the reference steering angle, and thus a correcting steering intervention results on the part of the LKS system toward the center of the lane. This is shown schematically in FIG. 3a. The guide torque applied by the LKS system in the direction of the center of the lane 16 is indicated by $M_E$.

When deliberately cutting a corner, a driver perceives such a steering intervention by the LKS system as unpleasant and interfering.

SUMMARY OF THE INVENTION

It is thus an objective of the exemplary embodiment and/or exemplary method of the present invention to create an LKS system that allows corners to be cut without intervening in the driving operation by closed-loop or open-loop control.

This objective is achieved according to the exemplary embodiment and/or exemplary method of the present invention by the features described herein. Further developments of the exemplary embodiment and/or exemplary method of the present invention are the subject matter of further features described herein.

An idea of the exemplary embodiment and/or exemplary method of the present invention is to modify the guiding behavior of the LKS system when cornering in such a way that, when cutting the corner, no or only very small artificial steering forces are applied to the steering system. On the other hand, when the path of motion deviates in the direction of the outside of the curve, then steering forces continue to be applied which alert the driver to the departure from the lane or guide the vehicle automatically back to the setpoint path of motion. Thus, the LKS system distinguishes between a deviation in the direction of the inside of the curve and a deviation in the direction of the outside of the curve. The guiding behavior may thus also be called asymmetrical.

According to a specific embodiment of the present invention, an open-loop or closed-loop control characteristic curve is asymmetrically widened when cornering, a dead zone being produced in the process for the system deviation, in which no or a small guide torque is generated. That is to say that no or only small steering forces are applied to the steering system when cutting a corner as long as the system deviation is within the dead zone. If the system deviation, on the other hand, becomes greater than the dead zone (because the driver cuts the corner too sharply), then the LKS system again intervenes in a controlling manner. When the vehicle deviates in the direction of the outside of the curve, the control response may remain unchanged as when driving straight ahead.

The size of the dead zone may depend on at least one additional driving state variable, in particular the driving speed and/or the yaw rate and/or the transverse acceleration and/or the course of the curve, and may be chosen to be of such a magnitude that the driver on the one hand has enough leeway to cut the corner and on the other hand is prevented from leaving the lane toward the interior of the curve.

The control response of the LKS system may be already modified before the vehicle enters a curve. In the approach of the curve, the size of the dead zone may grow steadily, reaches its maximum value at the apex of the curve, and falls again to the starting value when leaving the curve. The dead zone or the guiding behavior of the LKS control may not be modified abruptly.

The characteristic curve may map the deviation of a state variable, such as e.g. a steering angle deviation, onto a guide variable, such as e.g. a steering torque. By dimensioning the open-loop or closed-loop control characteristic curve, the guiding behavior of the LKS system may be varied between semiautomatic (supporting) and fully automatic guidance.

The open-loop or closed-loop control characteristic curve may have a P-behavior and in particular not an I-behavior.

The open-loop or closed-loop characteristic curve may be symmetrical (centrosymmetric) when driving straight ahead, and is modified into an asymmetrical characteristic curve when entering a curve.

Apart from the aforementioned possibility of changing the open-loop or closed-loop characteristic curve when cornering, the reference steering angle $\delta_{ref}$ could alternatively be calculated differently when cornering, for example, or the system deviation could be modified.

The functions may be stored as software in a control unit.

In the following, the exemplary embodiment and/or exemplary method of the present invention is explained in greater detail by way of example, with reference to the attached drawings.

DETAILED DESCRIPTION

Figure 1:
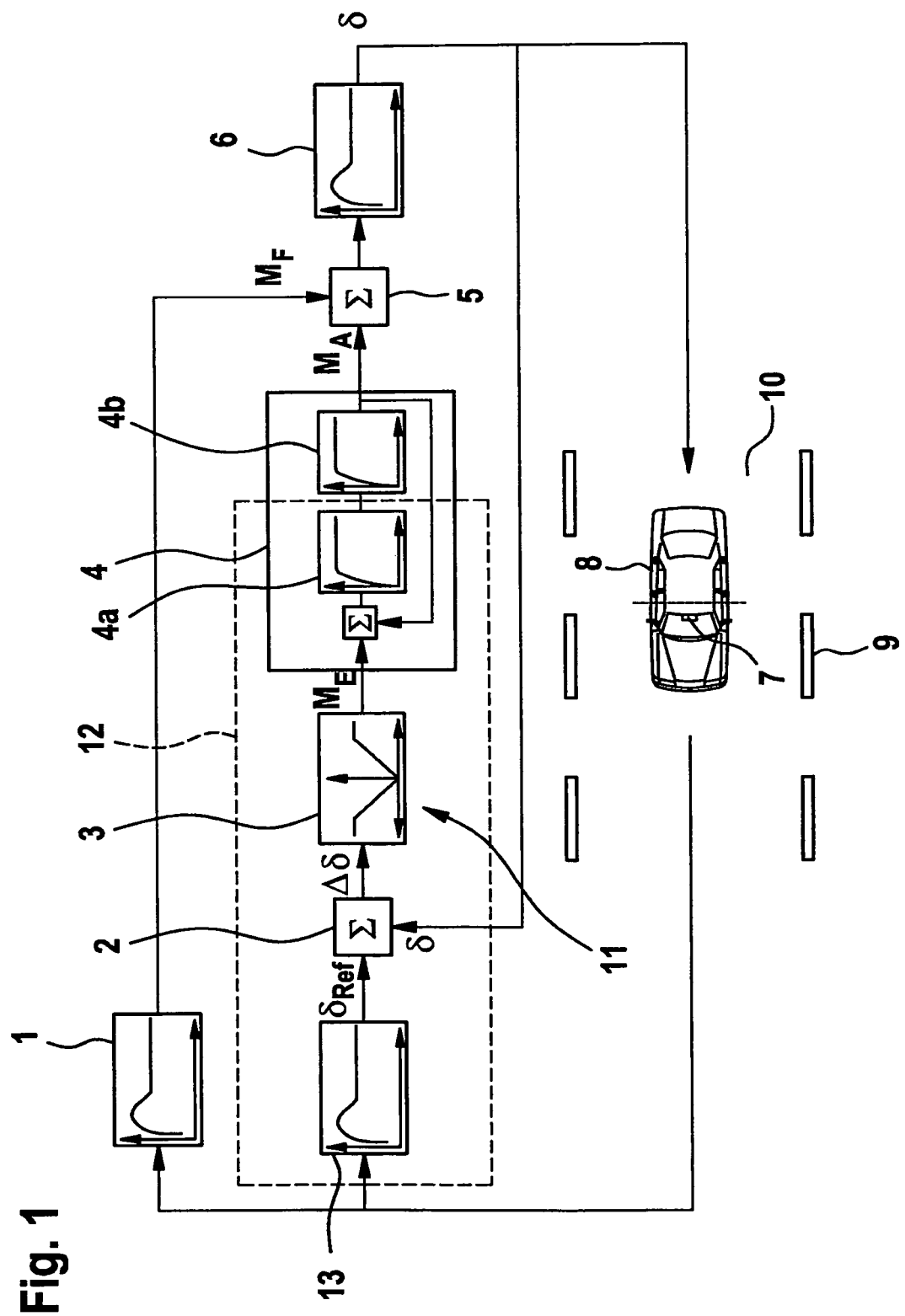
FIG. 1 shows a schematic representation of an LKS system having a fully automatic guidance.
Figure 2:
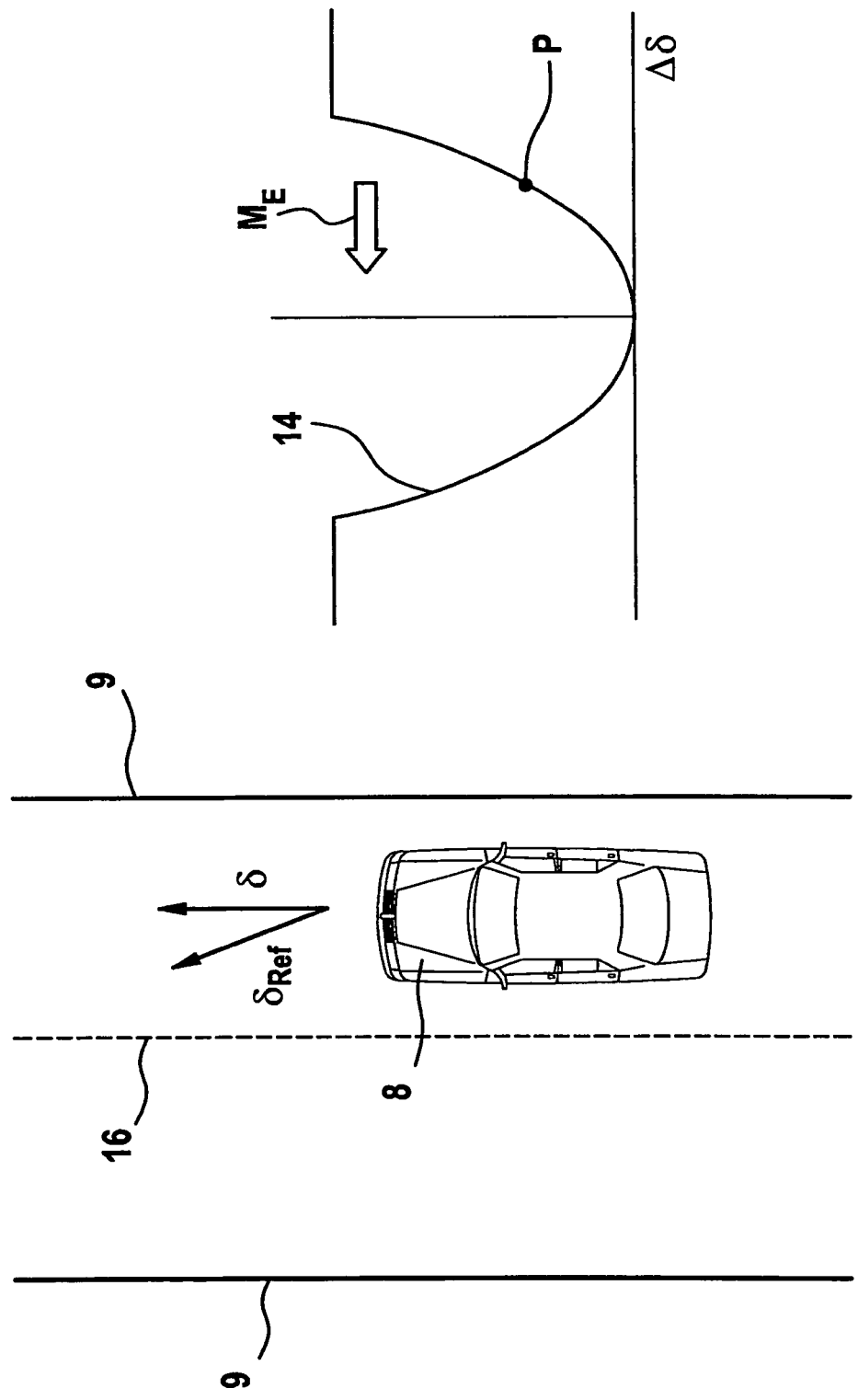
FIG. 2 shows the guiding behavior of a known LKS system in the deviation of a vehicle from a setpoint path of motion.
Figure 3A:
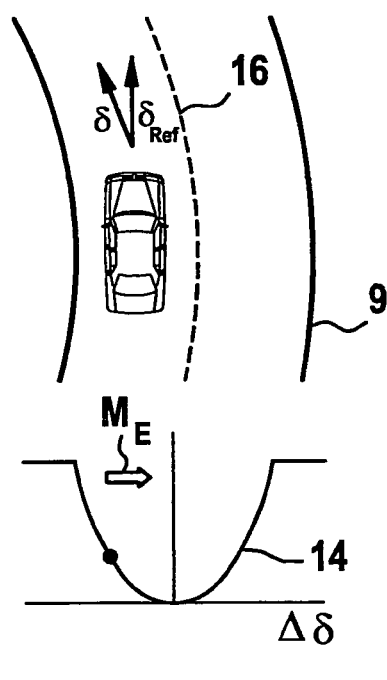
FIG. 3a shows the guiding behavior of a known LKS system when cutting a corner.

Reference is made to the introductory part of the specification regarding the explanation of FIGS. 1, 2 and 3a.

Figure 3B:
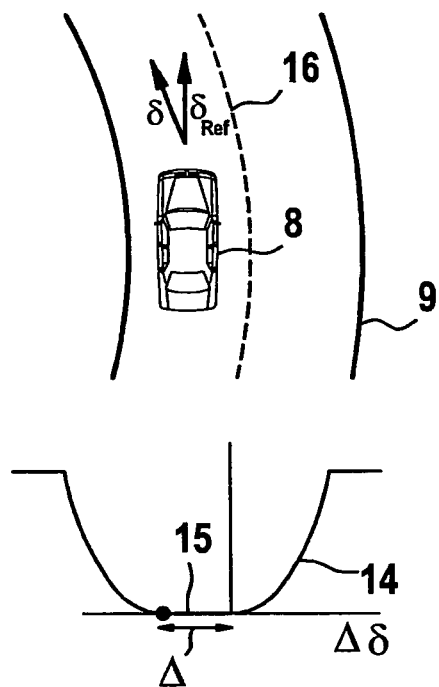
FIG. 3b shows the guiding behavior of an LKS system according to the present invention when cutting a corner.

FIG. 3b shows the guiding behavior of an LKS system according to the present invention while cornering, in the process of which the driver cuts the corner. As may be seen, vehicle 8 is traveling outside of the center of the lane (corresponding in this case to the setpoint path of motion) too far in the interior of the curve. This results in a deviation between the steering angle chosen by the driver and the reference steering angle calculated by reference model 13. In contrast to the known LKS system in FIG. 3a, however, no correcting steering intervention results in this case. This is achieved by the fact that controller characteristic curve 14 is widened asymmetrically and a dead zone 15 is created, in which no guide torque $M_E$ is produced in spite of a system deviation M. Within dead zone 15, characteristic curve 14 and thus guide torque $M_E$ is equal to zero or assumes only very low values. This gives the driver sufficient leeway to cut the corner without the LKS system intervening in a regulating manner.

The size of dead zone 15 may be a function of various driving state parameters, in particular the driving speed, the yaw rate, the transverse acceleration and/or the curve course of the roadway. It is chosen to be of such a size that the driver may indeed cut the corner, but continues to be prevented from leaving the lane in the direction of the interior of the curve.

Figure 4:
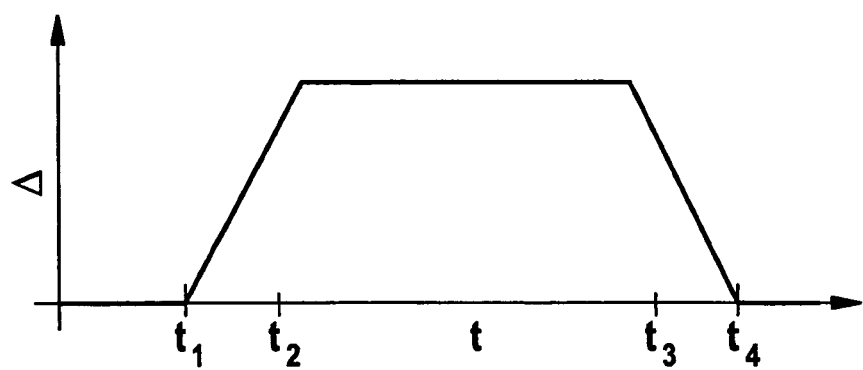
FIG. 4 shows the characteristic of the magnitude of a dead zone when driving through a curve.

FIG. 4 shows the buildup and decline of dead zone 15 from entering a curve to exiting the curve over time t. As can be seen, the size of dead zone 15 already grows before entering the curve (time $t_1$) and reaches its maximum value at the apex of the curve (time $t_2$). The maximum value is maintained until vehicle 8 leaves the curve again (time $t_3$) and is then reduced continuously toward zero. When driving straight ahead, characteristic curve 14 then in turn corresponds to the one from FIG. 2.

The modification according to the exemplary embodiment and/or exemplary method of the present invention of the guiding behavior when cornering may be implemented both in semiautomatic systems, which only provide steering indications to the driver, as described above, as well as in fully automatic systems.

THE LIST OF REFERENCE SYMBOLS IS AS FOLLOWS:

1 driver
2 adding node
3 controller
4 control element having a torque control loop
4a controller of control element 4
4b actuator of control element 4
5 adding node
6 steering system
7 lane detection system
8 vehicle
9 lateral marking
10 lane
11 control loop
12 control unit
13 reference model
14 characteristic curve
15 dead zone
16 center of the lane

What is claimed is:

1. A device for keeping a vehicle in its lane, comprising:
   a steering intervention arrangement to apply a steering torque to a steering system of the vehicle via a steering control element in the event of a deviation of a path of motion of the vehicle from a setpoint path of motion;
   a modifying arrangement to modify, when cornering along a curve and responsive to a determination that the path of motion of the vehicle deviates from the setpoint path of motion in a direction towards an inside of the curve, a guiding behavior of the steering intervention arrangement so that lower steering torques are applied to the steering system than in the event of a corresponding deviation in a direction towards an outside of the curve; and
   one of an open-loop control device and a closed-loop control device which includes a characteristic curve which is asymmetrically widened when cornering, a dead zone being specified for a steering deviation such that responsive to a determination that the steering deviation falls within the dead zone, small or no steering torques are applied to the steering system;
   wherein the size of the dead zone is a function of the course of the curve along which the vehicle is traveling.

2. The device of claim 1, wherein:
   a reference model which receives, from a lane detection system, geometric data regarding a position of the vehicle in the lane and data regarding a course of the lane, and which determines a setpoint variable from the received data; and
   the one of an open-loop control device and a closed-loop device, which as a function of a difference between the setpoint variable and a corresponding state variable, generates a control signal, the control signal is applied with the steering control element to the steering system of the vehicle to guide the vehicle to the setpoint path of motion.

3. The device of claim 1, wherein the size of the dead zone is further a function of at least one of a driving speed, a yaw rate, and a lateral acceleration.

4. The device of claim 1, wherein the guiding behavior is modified shortly before entering a curve.

5. The device of claim 1, further comprising:
   a steering angle control loop arrangement having a controller.

6. The device of claim 1, wherein, when driving straight ahead, the characteristic curve is a symmetrical characteristic curve, that is modified to become an asymmetrical characteristic curve when cornering.

7. The device of claim 1, wherein one of a modified reference steering angle and a modified system deviation is determined when cornering to allow for cutting the corner.

8. The device of claim 1, further comprising:
   a steering angle control loop arrangement having a controller,
   wherein the guiding behavior is modified shortly before entering a curve, and wherein one of a modified reference steering angle and a modified system deviation is determined when cornering to allow for cutting the corner.

9. The device of claim 1, further comprising:
   a steering angle control loop arrangement having a controller;
   wherein the size of the dead zone is further a function of at least one of a driving speed, a yaw rate, and a lateral acceleration, and wherein the guiding behavior is modified shortly before entering a curve.

10. The device of claim 9, wherein, when driving straight ahead, the characteristic curve is a symmetrical characteristic curve, that is modified to become an asymmetrical characteristic curve when cornering.

11. The device of claim 9, wherein one of a modified reference steering angle and a modified system deviation is determined when cornering to allow for cutting the corner.

* * * * *